United States Patent
Kawahara et al.

(10) Patent No.: US 6,924,453 B2
(45) Date of Patent: Aug. 2, 2005

(54) MACHINING CONTROL METHOD FOR WIRE-CUT ELECTRIC DISCHARGE MACHINE

(75) Inventors: Akiyoshi Kawahara, Yamanashi (JP); Tomoyuki Furuta, Yamanashi (JP)

(73) Assignee: Fanuc LTD, Yamanashi (JP)

(*) Notice: Subject to any disclaimer, the term of this patent is extended or adjusted under 35 U.S.C. 154(b) by 0 days.

(21) Appl. No.: 10/912,164

(22) Filed: Aug. 6, 2004

(65) Prior Publication Data

US 2005/0040142 A1 Feb. 24, 2005

(30) Foreign Application Priority Data

Aug. 22, 2003 (JP) ........................... 2003-298662

(51) Int. Cl.$^7$ .................... B23H 7/02; B23H 7/20
(52) U.S. Cl. .................... 219/69.12; 219/69.16
(58) Field of Search .................... 219/69.12, 69.16, 219/69.17, 69.13; 700/162

(56) References Cited

U.S. PATENT DOCUMENTS 5,545,870 A * 8/1996 Fujii et al. ............... 219/69.13
5,689,427 A * 11/1997 Li et al. .................... 700/162

FOREIGN PATENT DOCUMENTS

| JP | 4-30915 A | * | 2/1992 | ......... 219/69.12 |
| JP | 4-030915 | | 2/1992 | |
| JP | 10-76429 A | * | 3/1998 | |
| JP | 11-170118 | | 6/1999 | |
| JP | 2002-254250 | | 9/2002 | |

* cited by examiner

Primary Examiner—Geoffrey S. Evans
(74) Attorney, Agent, or Firm—Staas & Halsey LLP

(57) ABSTRACT

The number of electric discharge pulses is detected every given period. A deviation between the detected number and a target number of electric discharge pulses is obtained. Based on the obtained deviation, a correction value for the correction of a machining path in a direction normal to the machining path is calculated, whereby a corrected path is obtained. A wire electrode is moved relatively to a workpiece along the corrected path.

20 Claims, 6 Drawing Sheets

MACHINING CONTROL METHOD FOR WIRE-CUT ELECTRIC DISCHARGE MACHINE

BACKGROUND OF THE INVENTION

1. Field of the Invention

The present invention relates to a machining control method for controlling axis feed, capable of ensuring stable finish machining.

2. Description of the Related Art

In a known axis feed control method for finish machining, a machining characteristic value, such as the number of electric discharge pulses between a wire and a workpiece or machining voltage, is detected to control an axis feed speed so that the machining characteristic value agrees with a target value, thereby controlling an axis feed along a predetermined path. This control method is intended to obtain a fixed machining groove width after machining is finished. If this method is used in actual finish machining, however, expected machining shapes sometimes may fail to be ensured in the vicinity of corner portions, in particular.

If a workpiece 1 involves a portion that is poor in shape accuracy, as shown in FIG. 1A, a given offset value cannot be secured between a finished surface of the workpiece and a machining path 2. In some cases, therefore, a gap between the wire and the workpiece may be too wide to cause electric discharge, and the surface may fail to be finished. If the gap is too narrow, as shown in FIG. 2A, on the other hand, a hunting or short circuit between the workpiece and the wire electrode may occur. In this case, the surface cannot be finished, and besides, machining must be stopped inevitably.

In a constant-speed feed control method, on the other hand, an axis is fed at a constant speed in the same manner as in the control method described above. Also in this control method, electric discharge cannot be enjoyed at wide-gap portions, and the axis is fed with a short circuit at narrow-gap portions. Thus, uniform surface roughness cannot be secured for an entire machined surface.

A method for improving the surface roughness for finish machining is described in Japanese Patent Application Laid-open No. 11-170118. According to this method, voltage at a gap between a workpiece and a wire electrode is detected, and the wire is relatively moved in a direction substantially perpendicular to a machining path so that the difference between the detected gap voltage and a reference voltage is zero. This method prevents formation of waviness on the machined surface.

Another conventional axis feed control method based on the number of electric discharge pulses is described in Japanese Patent Application Laid-open No. 2002-254250. According to this method, the ratio between the number of electric discharge pulses detected during machining and a reference number of electric discharge pulses is obtained to control a distance of relative movement between a wire and a workpiece that is obtained every given time. Alternatively, a discharge dead time is controlled so that the detected number of pulses is equal to the reference number of pulses. With this method, breaking of wire during machining of corner portions can be prevented, and the machining speed and machining accuracy can be improved.

Another method is described in Japanese Patent Application Laid-open No. 4-30915. According to this method, a period for obtaining an average electric discharge pulse number used for a threshold value is varied depending on cases where the number of electric discharge pulses is increasing and decreasing, individually. The off-time duration of electric discharge pulses is controlled by comparing the obtained threshold value and the detected number of electric discharge pulses, whereby breaking of wire during machining of corner portions can be prevented.

A method of finishing for uniform surface roughness is proposed in Japanese Patent Application Laid-open No. 11-170118. This method is a gap-voltage control-method in which gap voltage between a wire electrode and a workpiece is controlled to be equal to a reference voltage. In order to finish an entire machined surface efficiently and uniformly, the number of electric discharge pulses per unit distance must be controlled to be fixed. The number of electric discharge pulses may be supposed to be fixed if the gap voltage is fixed. Even if the gap voltage is fixed, however, the number of pulses is not always fixed. This is because the machining voltage depends greatly on an electric discharge delay time that elapses from the instant that voltage is applied between the wire and the workpiece until electric discharge starts. In ordinary electric discharge machining, the electric discharge delay time is uneven, so that the machining voltage sometimes may vary despite the fixed number of electric discharge pulses. Thus, satisfactory surface roughness cannot be obtained with use of the control method based on the machining voltage, which is described in Japanese Patent Application Laid-open No. 11-170118.

The foregoing methods described in Japanese Patent Application Laid-open Nos. 2002-254250 and 4-30915 are control methods based on the number of electric discharge pulses. However, these methods are intended to control the feed speed, discharge dead time, etc., and more particularly, to prevent breaking of wire and the like. It is hard for the conventional methods to ensure uniform machined surface roughness in machining workpieces of complicated shapes involving low-accuracy shapes.

SUMMARY OF THE INVENTION

According to the present invention, there is provided a machining control method for a wire-cut electric discharge machine which has a feed axis drive mechanism capable of changing relative positions of a wire and a workpiece and has a function to detect the number of electric discharge pulses. The method comprises (1) a step of detecting the number of electric discharge pulses, (2) a step of calculating a correction value to be given to a machining path in accordance with the detected number of pulses, (3) a step of correcting the predetermined machining path by the correction value, and (4) a step of controlling the feed axis along the corrected machining path, thereby correcting the machining path. Thus, the number of electric discharge pulses becomes uniform so that the machined surface roughness becomes uniform. The machining path is corrected by a correction value in a direction normal to the machining path. Alternatively, the machining path is corrected in like manner by correcting an offset value by the correction value so that the machined surface roughness is uniform. The correction value is obtained by multiplying a difference between the detected number of electric discharge pulses and a target value thereof by a predetermined gain. Alternatively, the correction value is an accumulated value obtained by adding up every given period a value obtained by multiplying a difference between the detected number of electric discharge pulses and a target value thereof by a predetermined gain.

Machining voltage is detected in place of the number of electric discharge pulses, the value obtained by multiplying a difference between the detected machining voltage and a target value thereof by a predetermined gain is added every given period to obtain a correction value, and a direction normal to the machining path is obtained, thereby correcting the machining path by applying the correction value in the normal direction. Alternatively, an offset value is corrected, and the machining path is obtained with use of the corrected offset value for machining.

The machining is carried out with the axis fed at a predetermined fixed speed.

According to the present invention, the number of electric discharge pulses is uniform, so that the machined surface can enjoy uniform surface roughness. In consequence, uniform roughness can be obtained as required for the entire machined surface without causing a hunting or disabling machining operation, in machining workpieces of complicated shapes involving low-accuracy shapes, which could not be tackled by the conventional axis feed control methods.

BRIEF DESCRIPTION OF THE DRAWINGS

The forgoing and other objects and feature of the invention will be apparent from the following description of preferred embodiments of the invention with reference to the accompanying drawings, in which.

DESCRIPTION OF THE PREFERRED EMBODIMENTS

Figure 1A:
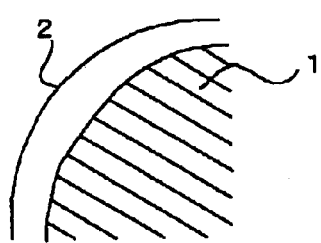
FIGS. 1A and 1B are views illustrating finish machining for a convex corner portion with poor shape accuracy.
Figure 1B:
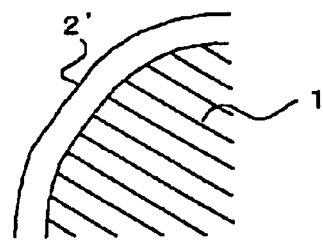

An outline of a machining control method according to the present invention will be described first. FIG. 1A is a view illustrating finish machining for a convex corner portion with poor shape accuracy. When the shape accuracy of a machined surface of the convex corner portion of a workpiece 1 is poor, a wide gap will be formed between an instructed machining path 2 and the workpiece 1. In some cases, therefore, electric discharge may fail to occur, thereby lowering the roughness of the machined surface. Thus, according to the present invention, the machining path 2 is corrected into a corrected machining path 2' that matches the machined surface shape of the workpiece 1, as shown in FIG. 1B. By doing this, the number of electric discharge pulses is made uniform to ensure even surface roughness.

Figure 2A:
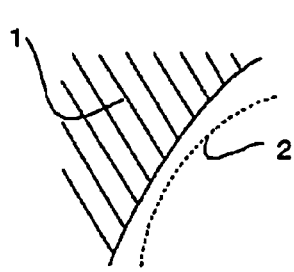
FIGS. 2A and 2B are views illustrating finish machining for a concave corner portion with poor shape accuracy.
Figure 2B:
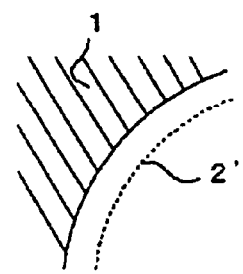

FIG. 2A shows a case where the shape accuracy of a concave corner portion of the workpiece 1 is so poor that the gap between the instructed machining path 2 and the workpiece 1 is too narrow. In this case, a hunting or short circuit occurs, so that the machined surface roughness of this corner portion lowers. Thus, according to the present invention, the machining path 2 is corrected into the corrected machining path 2' that matches the machined surface shape of the workpiece, as shown in FIG. 2B. By doing this, the number of electric discharge pulses is made uniform to ensure even surface roughness.

Figure 3A:
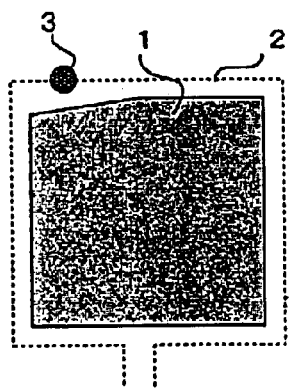
FIGS. 3A to 3C are diagrams illustrating finish machining according to the present invention.
Figure 3B:
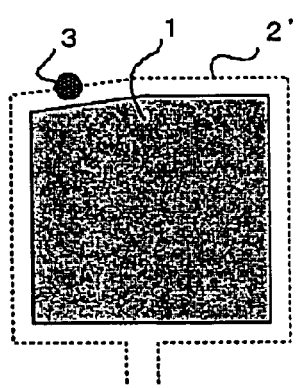
Figure 3C:
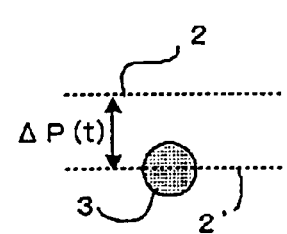

More specifically, according to the present invention, the corrected machining path 2' that matches the machined surface shape of the workpiece 1 can be obtained, as shown in FIG. 3B, even if the shape accuracy of the workpiece 1, which is machined by rough machining or the like, is so poor that the gap between the workpiece 1 and the machining path 2 for finish machining fluctuates and becomes too wide to cause electric discharge, as shown in FIG. 3A, or if the gap is narrowed to cause a hunting or short circuit. For a machining path 2 that is programmed in advance, a correction value $\Delta P(t)$ is obtained such that the number of electric discharge pulses for the workpiece machined surface shape is equal to a target number of pulses, as shown in FIG. 3C. Based on this correction value $\Delta P(t)$, the machining path 2 is corrected, and the corrected machining path 2' along which a wire electrode 3 actually passes is obtained for machining.

Figure 4:
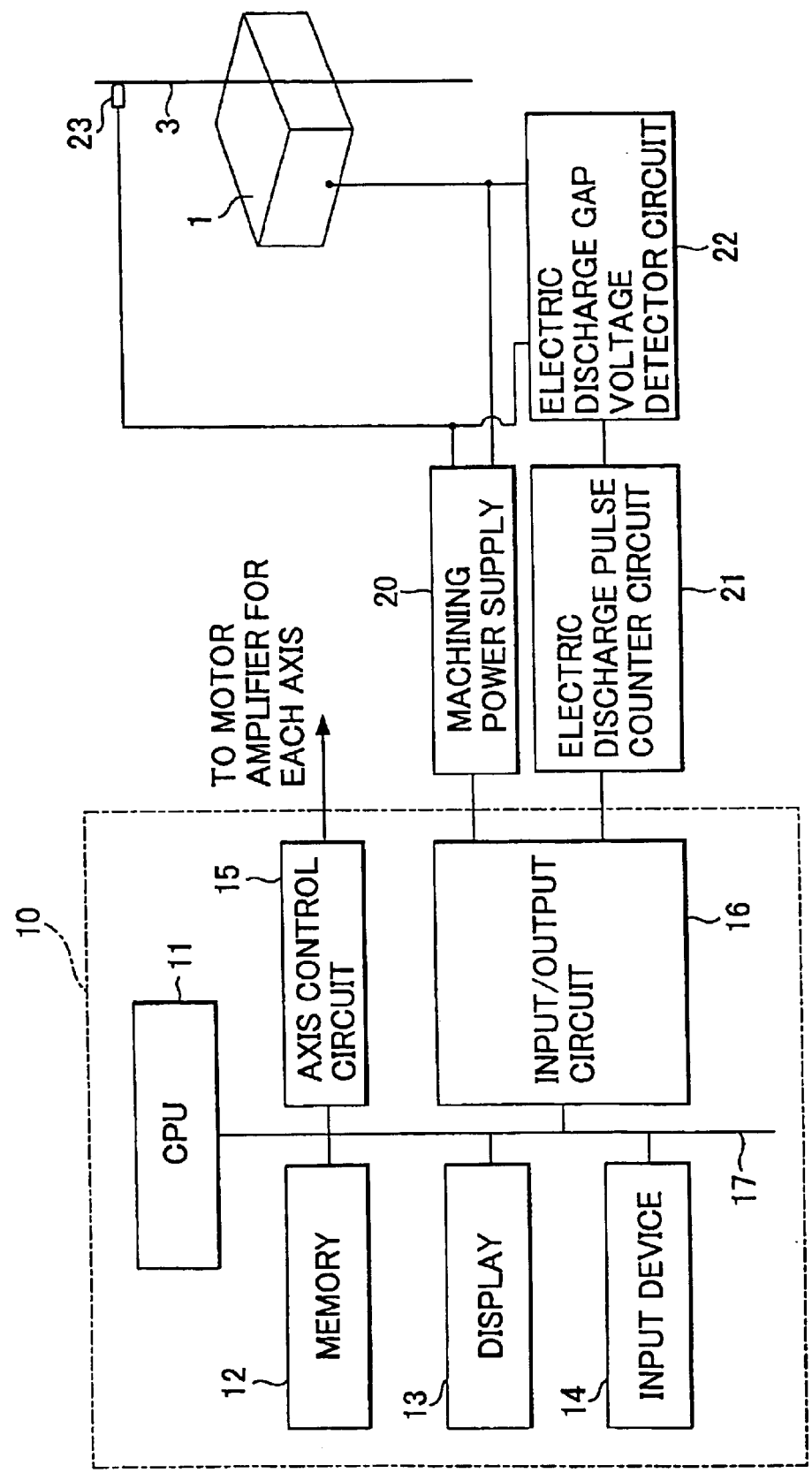
FIG. 4 is a block diagram showing principal parts of a wire-cut electric discharge machine for carrying out each embodiment of the invention.

FIG. 4 is a block diagram showing principal parts of a wire-cut electric discharge machine for carrying out the machining control method of the invention. Since this wire-cut electric discharge machine is constructed in the same manner as a conventional one, FIG. 4 shows only the principal parts that are relevant to the invention.

A control unit 10 that controls the wire-cut electric discharge machine comprises a processor 11, memory 12, a display 13, and an input device 14, such as a keyboard through which data and commands are inputted. The control unit 10 further comprises an axis control circuit 15, which drivingly controls servomotors for moving the workpiece 1 relatively to the wire electrode 3, an input/output circuit 16, and the like. The elements 12 to 16 are connected to the processor 11 by a bus 17.

The memory 12 is loaded with system programs for controlling the wire-cut electric discharge machine, machining programs for machining the workpiece 1, etc. through the display 13 and the input device 14 or through an input interface (not shown). Further, the memory 12 is stored with preset machining conditions. The axis control circuit 15 is connected with amplifiers for a servomotor that drives a table fitted with the workpiece 1 in X- and Y-axis directions that are perpendicular to each other, a servomotor for driving an upper wire guide in a Z-axis direction that is perpendicular to the X- and Y-axis directions, and a servomotor for driving U- and V-axes for taper machining.

The input/output circuit 16 is connected with a machining power supply 20, electric discharge pulse counter circuit 21, etc. The power supply 20 is connected to the workpiece 1 and the wire electrode 3. Voltage is applied between the workpiece 1 and the electrode 3 so that electric discharge occurs in a gap between the workpiece 1 and the electrode 3 and serves for machining.

Connected between the workpiece 1 and the wire electrode 3 is an electric discharge gap voltage detector circuit 22 that detects the voltage between the workpiece 1 and the electrode 3. Based on the voltage detected by the detector circuit 22, the electric discharge pulse counter circuit 21 detects and counts generated electric discharge pulses. Reference numeral 23 denotes a conductor through which current is supplied to the wire electrode 3.

With this arrangement, the processor 11 drives the machining power supply 20 under the preset machining conditions, and causes the axis control circuit 15 to drive the servomotors for the individual axes in accordance with the machining programs stored in the memory 12. Thereupon, the workpiece 1 is moved relatively to the wire electrode 3, and electric discharge machining is effected. Based on the machining programs, the processor 11 obtains relative moved position commands for the wire electrode 3 with respect to the workpiece 1 every predetermined period, and distributes the commands to individual feed axes. The present invention differs from the prior art in the process of obtaining movement commands to the axes First, the finish machining is started based on conventional axis feed speed constant control. Based on the machining programs, as in the conventional case, the movement commands to the axes are obtained every control period. According to a first embodiment of the present invention, moreover, a path correction process shown in FIG. 5 is carried out.

Figure 5:
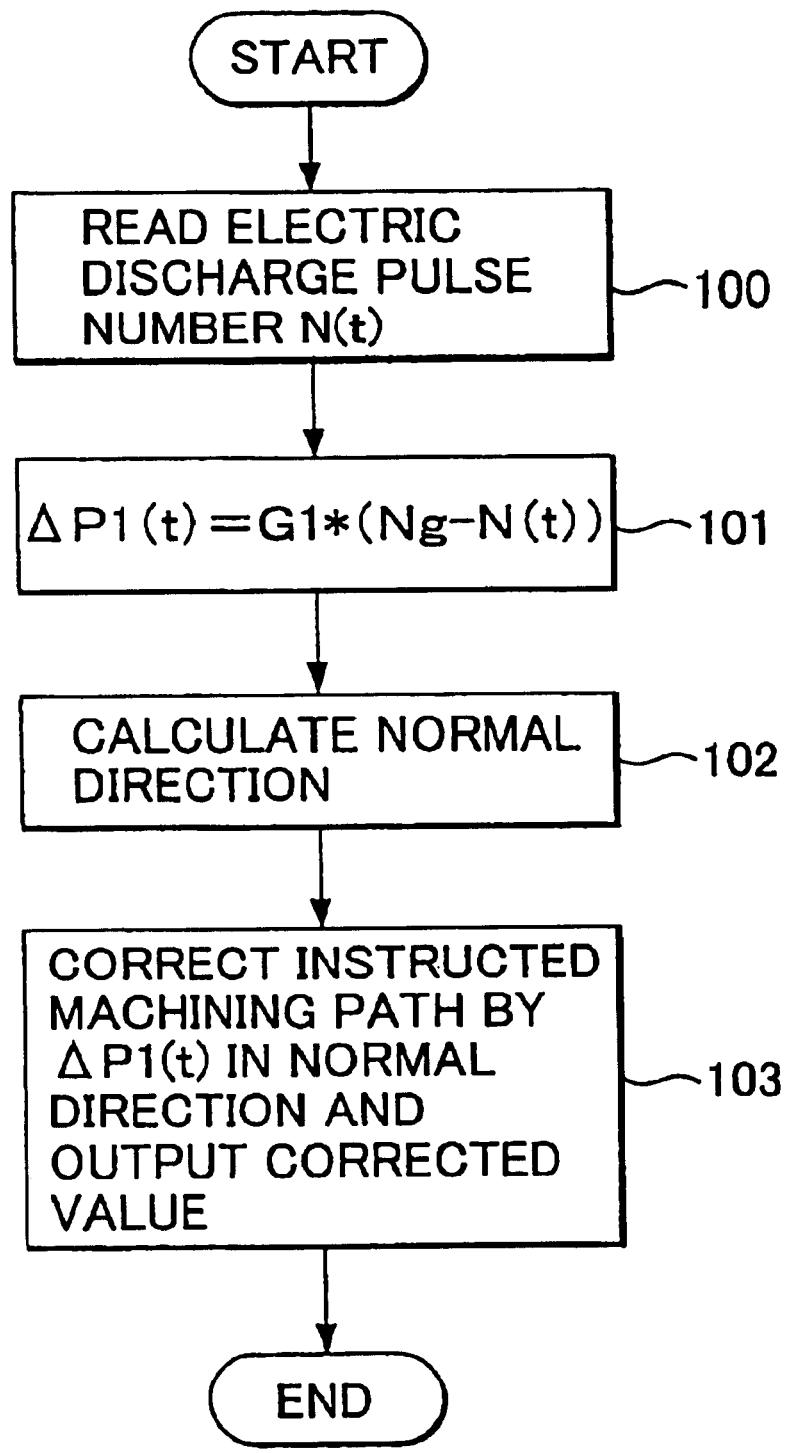
FIG. 5 is a flowchart showing a path correction process according to a first embodiment of the invention.

FIG. 5 is a flowchart showing the path correction process according to the first embodiment of the invention. The processor 11 reads an electric discharge pulse number N(t) from the electric discharge pulse counter circuit 21 and then resets a counter for counting the electric discharge pulses (Step 100). By multiplying by a gain G1 a value obtained by subtracting the read electric discharge pulse number N(t) from a preset target electric discharge pulse number Ng, a correction value $\Delta P1$ (t) is obtained (Step 101).

Then, the direction normal to the path of movement of the wire electrode is obtained in accordance with the movement command that is obtained in the present period based on a machining program command (Step 102). The movement command for the present period, obtained based on the machining program command, is corrected in the normal direction by the correction value $\Delta P1$ (t) obtained in Step 101, and the corrected movement command is outputted as a current movement command (Step 103).

Thus, if the detected electric discharge pulse number N(t) is smaller than the target electric discharge pulse number Ng, the correction value $\Delta P1$ (t) is positive, and the movement command for the present period is corrected so that the wire electrode 3 comes closer to the workpiece 1 by a margin corresponding to the correction value in the normal direction. If the detected electric discharge pulse number N(t) is larger than the target electric discharge pulse number Ng, on the other hand, the correction value $\Delta P1$ (t) is negative, and the movement command is corrected so that the electrode 3 moves away from the workpiece 1. Thereafter, these processes are repeatedly executed every control period.

Figure 8:
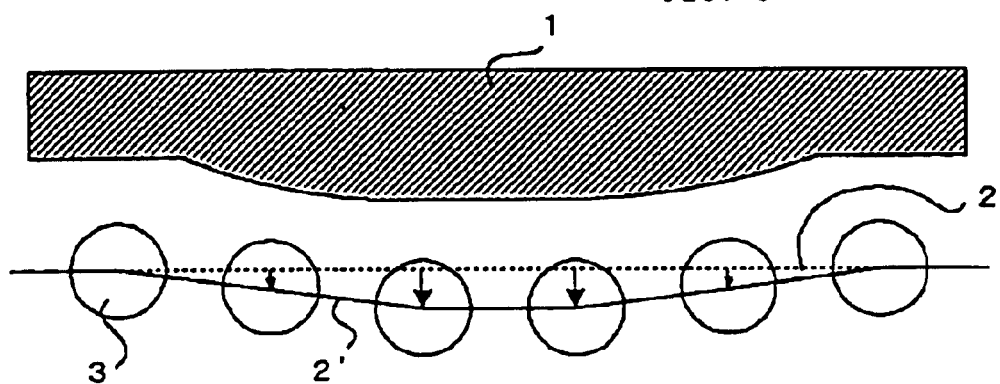
FIG. 8 is a view illustrating path correction operation according to each embodiment of the invention.

Here, path correction operation is explained with reference to FIG. 8 which shows an enlarged view of a portion of the workpiece 1. In the example of FIG. 8, a part of the workpiece 1 projects outwardly, and the machining path 2 is instructed by a machining programs as indicated by a broken line. When the wire electrode 3 reaches a position corresponding to this projecting part, the gap between the electrode 3 and the workpiece 1 narrows, with the result that the number of electric discharge pulses increases. In consequence, the detected electric discharge pulse number N(t) exceeds the target electric discharge pulse number Ng, and the correction value $\Delta P1$ (t) is negative. Thus, the wire electrode 3 passes along the corrected machining path 2' which is corrected in a normal direction by the correction value $\Delta P1$ (t) in a manner such that it recedes from the workpiece 1. The electric discharge pulse number N(t) is controlled to be equal to the target electric discharge pulse number Ng. If the shape accuracy of the workpiece is poor, therefore, the number of electric discharge pulses on the machined surface is uniform, so that the machined surface can enjoy uniform surface roughness.

Figure 6:
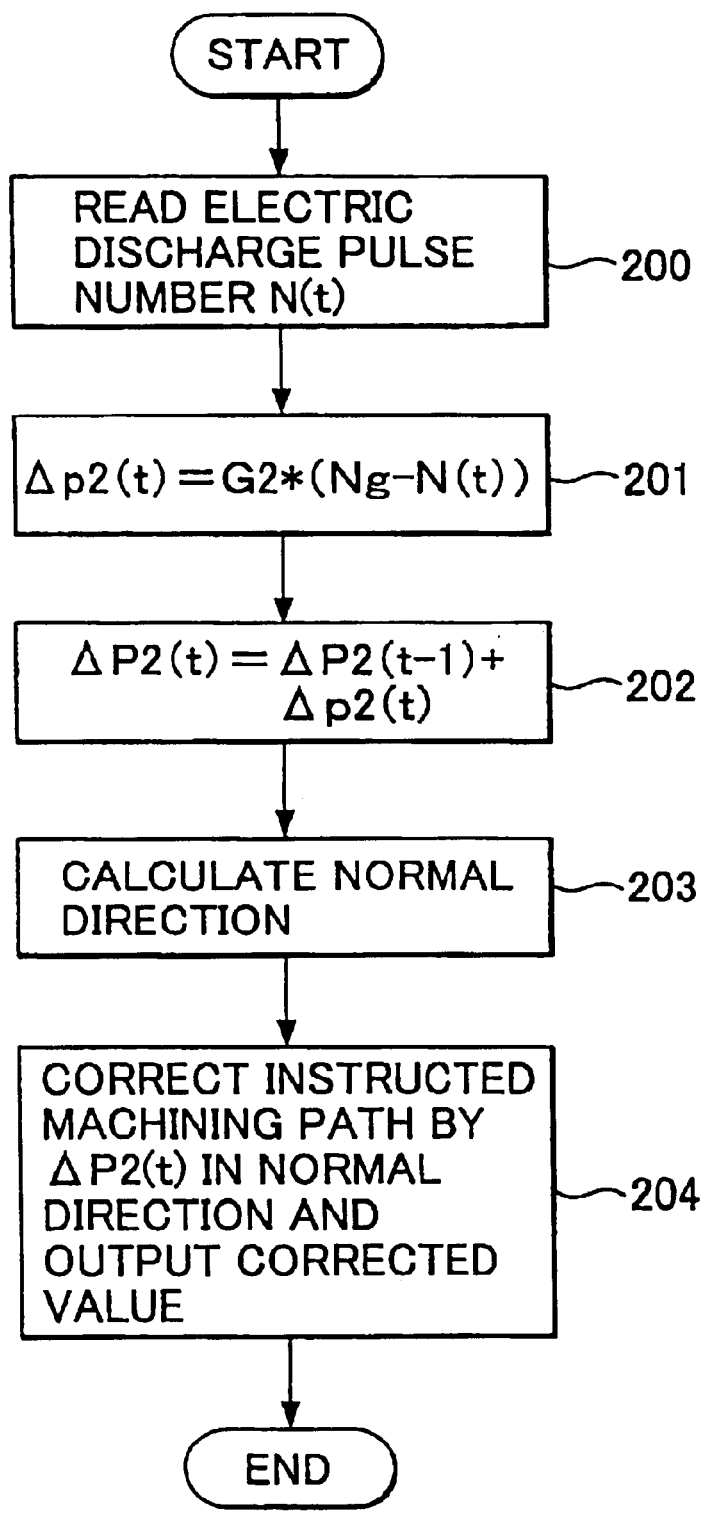
FIG. 6 is a flowchart showing a path correction process according to a second embodiment of the invention.

FIG. 6 is a flowchart showing a path correction process according to a second embodiment of the present invention. In the first embodiment shown in FIG. 5, the correction value $\Delta P1$ (t) is obtained by subtracting the detected electric discharge pulse number N(t) from the target electric discharge pulse number Ng. Therefore, the correction value changes so drastically that the machining may lack in stability. This second embodiment is intended to smooth the change of the correction value, thereby stabilizing the control. The second embodiment differs from the first embodiment in that the correction value is obtained by adding up values corresponding to deviations between the target electric discharge pulse number Ng and the detected electric discharge pulse number N(t).

First, the processor 11 reads the electric discharge pulse number N(t) from the electric discharge pulse counter circuit 21 and then resets the counter for counting the electric discharge pulses (Step 200). Values $\Delta p2$ (t), proportional to the deviations between the pulse numbers, are obtained by multiplying by a gain G2 a value obtained by subtracting the read electric discharge pulse number N(t) from the preset target electric discharge pulse number Ng (Step 201). Then, a correction value $\Delta P2$ (t) is obtained by adding the obtained values $\Delta p2$ (t) to a value $\Delta P2$ (t−1) that is stored in a register for correction value calculation (Step 202). More specifically, the correction value $\Delta P2$ (t) is obtained by adding up the values $\Delta p2$ (t) that are proportional to the deviations between the detected electric discharge pulse number N(t) and the target electric discharge pulse number Ng.

Thereafter, the direction normal to the path of movement of the wire electrode is obtained (Step 203), as in the case of the first embodiment. Then, the movement command for the present period, obtained based on the machining program command, is corrected in the normal direction by the correction value $\Delta P2$ (t) obtained in Step 202, and the corrected movement command is outputted as a current movement command (Step 204). The correction value $\Delta P2$ (t) obtained in Step 202 is overwritten as $\Delta P2(t-1)$ in the register for correction value calculation. Thereafter, these processes are repeatedly executed every control period.

In the case of the second embodiment, as described above, the correction value $\Delta P2$ (t) for the movement command is proportional to the value that is obtained by adding up the deviations between the detected electric discharge pulse number N(t) and the target electric discharge pulse number Ng. Therefore, the correction value $\Delta P2$ (t) never changes suddenly but smoothly, so that satisfactory machining stability can be obtained, and the machined surface can enjoy uniform roughness.

Figure 7:
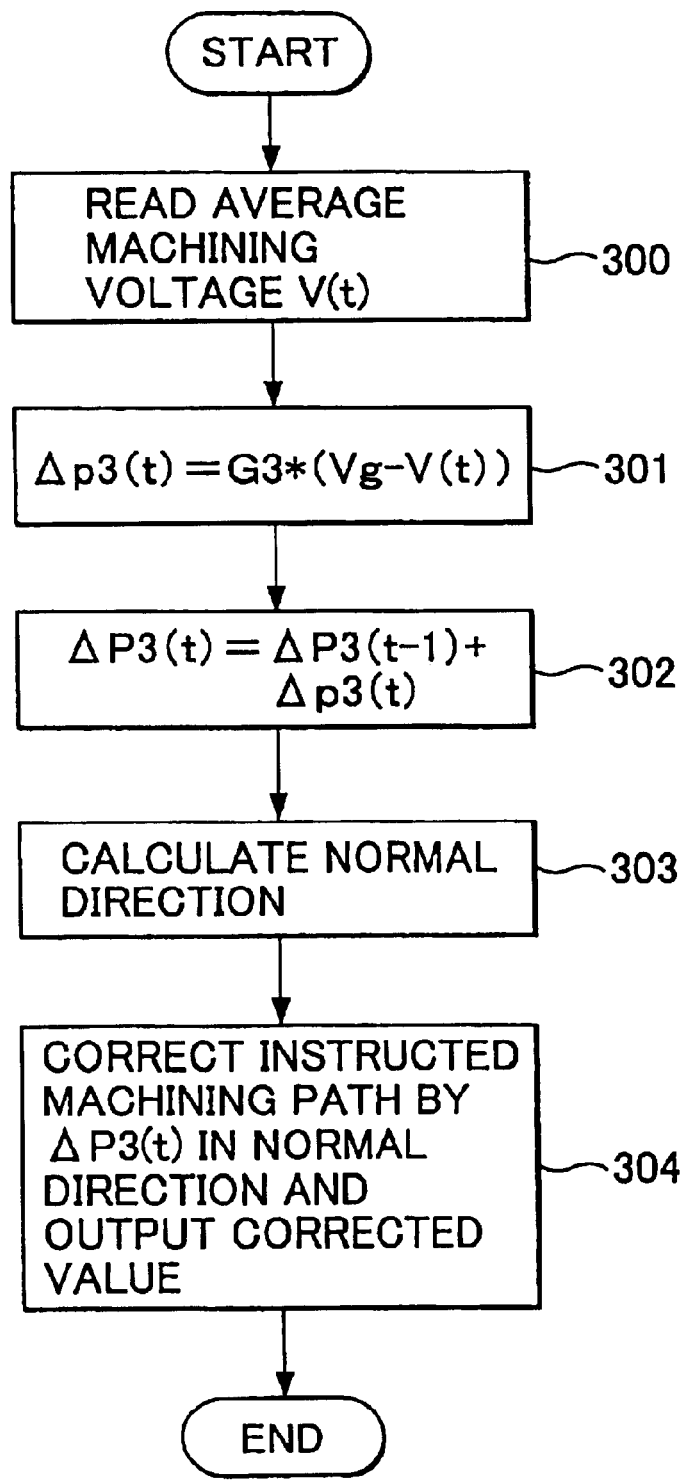
FIG. 7 is a flowchart showing a path correction process according to a third embodiment of the invention.

FIG. 7 is a flowchart showing a path correction process according to a third embodiment of the present invention. In this third embodiment, control is carried out with based on an average machining voltage, not on an electric discharge pulse number. In carrying out the third embodiment, the electric discharge pulse counter circuit 21 shown in FIG. 4 is replaced with an average machining voltage calculator circuit.

The processor 11 reads an average machining voltage V(t) from the average machining voltage calculator circuit (Step 300), and multiplies by a gain G3 a value obtained by subtracting the read average machining voltage V(t) from a preset target average machining voltage Vg, thereby obtaining a value Δp3 (t) that is proportional to the deviation of the average machining voltage V(t) (Step 301). Then, a correction value ΔP3 (t) is obtained by adding the obtained value Δp3 (t) to a value ΔP3 (t−1) that is stored in the register for correction value calculation (Step 302). More specifically, the correction value ΔP3 (t) is obtained by adding up the values that are proportional to the deviation between the target average machining voltage Vg and the detected average machining voltage.

Thereafter, the direction normal to the path of movement of the wire electrode is obtained (Step 303), as in the cases of the first and second embodiments. Then, the movement command for the present period, obtained based on the machining program command, is corrected in the normal direction by the correction value ΔP3 (t) obtained in Step 302, and the corrected movement command is outputted as a current movement command (Step 304). The correction value ΔP3 (t) obtained in Step 302 is overwritten as ΔP3 (t−1) in the register for correction value calculation. Thereafter, these processes are repeatedly executed every control period.

In the case of the third embodiment, as described above, the correction value ΔP3 (t) for the movement command is proportional to the value that is obtained by adding up the deviations between the detected average machining voltage V(t) and the target average machining voltage Vg. Therefore, the correction value ΔP3 (t) never changes suddenly, so that stable machining voltage can obtained. Thus, even if the machining voltage must be used in place of the electric discharge pulse number in consideration of special circumstances, definite effects, such as good machining stability and uniform surface roughness, can be enjoyed.

In each of the embodiments described herein, the normal direction is obtained in Step 102, 203 or 303. Alternatively, however, an offset process may be carried out to move the wire electrode 3 relatively to the workpiece 1 along the path instructed by the machining program with a given gap between the electrode and the workpiece. In this offset process, the path is offset in an offset direction (normal direction) by a programmed offset amount. Using this offset process, the offset value may be corrected by the correction value obtained in Step 102, 203 or 303 so that offset processing is carried out based on the corrected offset values, and then the program proceeds to Step 103, 204 or 304.

What is claimed is:

1. A machining control method for a wire-cut electric discharge machine which has a function to detect the number of electric discharge pulses, the method comprising:
    detecting the number of electric discharge pulses;
    calculating a correction value to be given to a machining path in accordance with the detected number of pulses;
    correcting the predetermined machining path by the correction value; and
    controlling a feed axis for moving a workpiece relatively to a wire along the corrected machining path, thereby correcting the machining path.

2. The machining control method for a wire-cut electric discharge machine according to claim 1, wherein the correction value is a correction value to be given in a direction normal to the predetermined machining path.

3. The machining control method for a wire-cut electric discharge machine according to claim 1, wherein the axis is fed at a predetermined fixed speed.

4. The machining control method for a wire-cut electric discharge machine according to claim 1, wherein the correction value is obtained by multiplying a difference between the detected number of electric discharge pulses and a target value thereof by a predetermined gain.

5. The machining control method for a wire-cut electric discharge machine according to claim 1, wherein the correction value is an accumulated value obtained by adding up every given period a value obtained by multiplying a difference between the detected number of electric discharge pulses and a target value thereof by a predetermined gain.

6. The machining control method for a wire-cut electric discharge machine according to claim 2, wherein the correction value is obtained by multiplying a difference between the detected number of electric discharge pulses and a target value thereof by a predetermined gain.

7. The machining control method for a wire-cut electric discharge machine according to claim 2, wherein the correction value is an accumulated value obtained by adding up every given period a value obtained by multiplying a difference between the detected number of electric discharge pulses and a target value thereof by a predetermined gain.

8. A machining control method for a wire-cut electric discharge machine which has a function to detect machining voltage, the method comprising:
    detecting the machining voltage;
    calculating a correction value by adding up every given period a value obtained by multiplying a difference between the detected machining voltage and a target value thereof by a predetermined gain;
    correcting an instructed offset value by the correction value to obtain a corrected offset value; and
    obtaining the corrected machining path in accordance with a programmed path and the corrected offset value to control a feed axis for moving a workpiece relatively to a wire along the machining path, thereby correcting the machining path.

9. The machining control method for a wire-cut electric discharge machine according to claim 8, wherein the axis is fed at a predetermined fixed speed.

10. A wire-cut electric discharge machine comprising:
    electric discharge pulse number counting means for measuring the number of electric discharge pulses variable depending on a gap between a wire electrode and a workpiece;
    electric discharge pulse deviation calculating means for calculating a difference between a preset reference value and the number of electric discharge pulses measured by said electric discharge pulse number counting means;
    normal direction calculating means for obtaining a direction normal to a path of movement, at the present position, along which a wire electrode moves relatively to a workpiece in accordance with a movement command; and
    movement command correcting means for correcting a present value of the movement command by an amount of correction given based on the difference calculated by said electric discharge pulse deviation calculating means in the normal direction obtained by said normal direction calculating means.

11. The wire-cut electric discharge machine according to claim 10, wherein the amount of correction corrected by said movement command correcting means is obtained by multiplying the difference calculated by said electric discharge pulse calculating means by a given coefficient.

12. The wire-cut electric discharge machine according to claim 10, wherein the amount of correction corrected by said movement command correcting means is an accumulation of past and present values each obtained by multiplying the difference calculated by said electric discharge pulse calculating means by a given coefficient.

13. A wire-cut electric discharge machine comprising:
   average machining voltage detecting means for detecting an average machining voltage between a wire electrode and a workpiece;
   machining voltage deviation calculating means for calculating a difference between a preset reference value and the average machining voltage detected by said average machining voltage detecting means;
   normal direction calculating means for obtaining a direction normal to a path of movement, at the present position, along which a wire electrode moves relatively to a workpiece in accordance with a movement command; and
   movement command correcting means for correcting a present value of the movement command by an amount of correction given based on the difference calculated by said machining voltage deviation calculating means in the normal direction obtained by said normal direction calculating means, wherein
   the amount of correction corrected by said movement command correcting means is an accumulation of past and present values each obtained by multiplying the difference calculated by said machining voltage deviation calculating means by a given coefficient.

14. A machining control method for a wire-cut electric discharge machine which has a function to detect the number of electric discharge pulses, the method comprising:
   detecting the number of electric discharge pulses;
   calculating a correction value to be given to a machining path in accordance with the detected number of pulses;
   correcting an instructed offset value by the correction value to obtain a corrected offset value; and
   obtaining the corrected machining path in accordance with a programmed path and the corrected offset value to control a feed axis for moving a workpiece relatively to a wire along the machining path, thereby correcting the machining path.

15. The machining control method for a wire-cut electric discharge machine according to claim 14, wherein the correction value is obtained by multiplying a difference between the detected number of electric discharge pulses and a target value thereof by a predetermined gain.

16. The machining control method for a wire-cut electric discharge machine according to claim 14, wherein the axis is fed at a predetermined fixed speed.

17. The machining control method for a wire-cut electric discharge machine according to claim 14, wherein the correction value is an accumulated value obtained by adding up every given period a value obtained by multiplying a difference between the detected number of electric discharge pulses and a target value thereof by a predetermined gain.

18. A machining control method for a wire-cut electric discharge machine which has a function to detect machining voltage, the method comprising:
   detecting the machining voltage;
   calculating a correction value by adding up every given period a value obtained by multiplying a difference between the detected machining voltage and a target value thereof by a predetermined gain;
   correcting a predetermined machining path by the correction value; and
   controlling a feed axis for moving a workpiece relatively to a wire along the corrected machining path, thereby correcting the machining path.

19. The machining control method for a wire-cut electric discharge machine according to claim 18, wherein the axis is fed at a predetermined fixed speed.

20. The machining control method for a wire-cut electric discharge machine according to claim 18, wherein the correction value is a correction value to be given in a direction normal to the predetermined machining path.

* * * * *

UNITED STATES PATENT AND TRADEMARK OFFICE
CERTIFICATE OF CORRECTION

| | | |
|---|---|---|
| PATENT NO. | : 6,924,453 B2 | Page 1 of 1 |
| APPLICATION NO. | : 10/912164 | |
| DATED | : August 2, 2005 | |
| INVENTOR(S) | : Akiyoshi Kawahara et al. | |

It is certified that error appears in the above-identified patent and that said Letters Patent is hereby corrected as shown below:

<u>Column 2,</u>
Line 9, delete "control-method" and insert -- control method --.

<u>Column 5,</u>
Line 11, after "axes" insert -- . --.

Signed and Sealed this

Fourth Day of July, 2006

JON W. DUDAS
*Director of the United States Patent and Trademark Office*